US006616804B2

(12) United States Patent  
Foster et al.

(10) Patent No.: US 6,616,804 B2
(45) Date of Patent: Sep. 9, 2003

(54) DURABLE ACOUSTICAL PANEL AND METHOD OF MAKING THE SAME

(75) Inventors: Robert E. Foster, Enon Valley, PA (US); Larry R. Parks, Rochester, PA (US); James R. Lokey, Beaver Falls, PA (US); John J. Janczura, Beaver Falls, PA (US); Robert G. Ganse, Lancaster, PA (US); Barry Buhay, Lancaster, PA (US); Walter W. Chamberlain, Lancaster, PA (US); John Felegi, Jr., Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/201,377

(22) Filed: Jul. 23, 2002

(65) Prior Publication Data

US 2003/0041987 A1 Mar. 6, 2003

Related U.S. Application Data

(62) Division of application No. 09/860,271, filed on May 18, 2001.
(60) Provisional application No. 60/206,687, filed on May 24, 2000.

(51) Int. Cl.$^7$ .............................. D21H 13/40; E04B 1/84
(52) U.S. Cl. ...................... 162/129; 162/145; 162/186; 162/208; 181/290; 181/294
(58) Field of Search ................................. 162/101, 102, 162/109, 123–129, 145–148, 152, 175, 183, 184, 186, 208, 210, 297, 298, 299, 300; 181/284–294; 428/411.1, 532–536, 537.1, 537.5, 323, 325, 326; 264/112, 113, 119, DIG. 31

(56) References Cited

U.S. PATENT DOCUMENTS

| 1,769,519 | A | * | 7/1930 | King et al. .................. 428/141 |
| 1,966,069 | A |   | 7/1934 | Kliefoth ...................... 181/284 |
| 2,077,720 | A | * | 4/1937 | Seigle et al. ................. 428/156 |
| 2,217,005 | A |   | 10/1940 | Clapp ........................... 162/3 |
| 3,283,849 | A |   | 11/1966 | Schirick et al. ............... 181/33 |
| 3,379,608 | A | * | 4/1968 | Roberts ...................... 162/145 |
| 3,444,956 | A |   | 5/1969 | Gaffney ....................... 181/33 |
| 3,513,009 | A |   | 5/1970 | Sauer et al. ................ 427/277 |
| RE27,109 | E |   | 3/1971 | Videen |
| 3,573,083 | A | * | 3/1971 | Gaffney ...................... 428/172 |
| 3,658,633 | A | * | 4/1972 | Jumentier et al. ........ 428/299.4 |
| 3,779,860 | A | * | 12/1973 | Oshida et al. .............. 162/129 |
| 3,979,254 | A | * | 9/1976 | McIntyre .................... 162/299 |
| 4,153,503 | A | * | 5/1979 | Booth et al. ................ 162/123 |
| 4,263,093 | A | * | 4/1981 | Shenk ......................... 162/109 |
| 4,463,039 | A |   | 7/1984 | O'Connell et al. ......... 427/421 |
| 4,585,685 | A | * | 4/1986 | Forry et al. ................. 428/143 |
| 4,911,788 | A | * | 3/1990 | Pittman et al. ............. 162/145 |
| 5,071,511 | A |   | 12/1991 | Pittman ...................... 162/145 |
| 5,277,762 | A |   | 1/1994 | Felegi, Jr. et al. .......... 162/145 |
| 5,492,756 | A |   | 2/1996 | Seale et al. .............. 156/275.5 |
| 5,753,871 | A |   | 5/1998 | Kahara et al. .............. 181/290 |
| 5,911,818 | A |   | 6/1999 | Baig .......................... 106/698 |
| 6,443,256 | B1 | * | 9/2002 | Baig .......................... 181/286 |

* cited by examiner

Primary Examiner—Steven P. Griffin
Assistant Examiner—Eric Hug
(74) Attorney, Agent, or Firm—Womble Carlyle Sandridge & Rice, PLLC

(57) ABSTRACT

An acoustical panel has a fiberboard which includes a fibrous filler and a base binder, and a nodulated overlay disposed on the fiberboard, wherein the overlay includes nodulated wool and an overlay binder and has a substantially smooth surface. In one embodiment of the present invention, the fibrous filler is mineral wool and the base binder is granular starch. In an another embodiment of the present invention, the nodulated wool is nodulated mineral wool and the overlay binder is cooked pearl cornstarch. A method of making the durable acoustical panel in accordance with the present invention is disclosed. Initially, an aqueous slurry comprising a fibrous filler, a base binder, and water is formed. The aqueous slurry is deposited onto a moving foraminous support wire to form an aqueous felt, thereby creating a continuous process. Thereafter, the aqueous felt is de-watered to form a wet felt. The wet felt is coated with an aqueous overlay comprising nodulated wool, overlay binder, and water and has a substantially smooth surface. Finally, the wet felt and aqueous overlay are dried to form the ceiling panel.

51 Claims, 2 Drawing Sheets

DURABLE ACOUSTICAL PANEL AND METHOD OF MAKING THE SAME

CROSS REFERENCE TO RELATED APPLICATION

This application is a division of application Ser. No. 09/860,271, filed on May 18, 2001, which is a nonprovisional of application Ser. No. 60/206,687, filed on May 24, 2000.

FIELD OF THE INVENTION

The present invention relates generally to the field of mineral fiberboards. More particularly, the present invention relates to a laminate panel having a mineral fiberboard and a nodulated mineral wool overlay thereon and to a method of making the same.

BACKGROUND OF THE INVENTION

Acoustical ceiling tiles provide aesthetic appeal, acoustical modification or dampening, accessibility to space above the ceiling plane, and simple installation and removal. Yet, such ceiling tiles having these features must be produced at a low cost. To accommodate these features, ceiling tiles are constructed using strong but relatively inexpensive materials such as newsprint paper, perlite, clays, mineral wool, and binder, such as starch. Acoustical dampening, however, requires the tile to be porous, especially on the surface of the tile. Examples of porous ceiling tiles are described in U.S. Pat. Nos. 1,769,519, 4,911,788, and 5,071,511.

Presently, consumer interest is directed to the surface durability of ceiling tiles. Unfortunately, porous materials are not as durable as more dense materials. The consumer not only desires the acoustical dampening that porous materials provide, but also expects the ceiling tiles to be free of blemishes once installed. Additionally, the ceiling must remain blemish free after the panels have been removed to access the plenum space above the tiles.

Although ceiling tiles made from porous mineral fiberboard have acceptable noise reduction coefficients (NRC), porous mineral fiberboards are soft and can be damaged during installation or removal. For example, surface dents can be easily created in porous mineral fiberboard from an installer's finger pressure, and surface scratches can likewise be created from pushing a tile across a metal grid support structure. To improve the surface durability, the weight percentage of a few of the materials utilized in constructing the mineral fiberboard can be increased, especially the binder and the mineral wool. However, the resulting mineral fiberboard, and the ceiling tile formed therefrom, is heavy and expensive.

Alternatively, laminate structures have been utilized to provide the desired characteristics of acoustical dampening, surface durability, and light weight. For example, one such laminate structure is formed by placing a durable woven scrim of glass or polymer on to the porous mineral fiberboard. Although this laminate may provide the desired NRC and surface durability properties, it is expensive to manufacture. Laminate structures which do not employ a scrim are discussed in U.S. Pat. Nos. 3,283,849 and 3,444,956.

Despite existing ceiling tiles formed from mineral fiberboards, the need remains for a durable acoustical panel which provides acoustical dampening, has a durable surface, is light-weight, and is inexpensively produced. Further, there remains a need for a method of manufacturing such a panel. Accordingly, it is to the provision of a durable acoustical panel that meets these needs that the present invention is primarily directed.

SUMMARY OF THE INVENTION

This invention overcomes the disadvantages of the prior art by providing a durable, lightweight acoustical panel which has a substantially smooth, durable surface, yet provides acoustical dampening at a relatively low manufacturing cost. The acoustical panel comprises a fiberboard comprising a fibrous filler and a base binder, and a nodulated overlay disposed on the fiberboard, wherein the overlay comprises nodulated wool and an overlay binder. In one embodiment of the present invention, the fibrous filler is mineral wool and the base binder is granular starch. In another embodiment of the present invention, the nodulated wool is nodulated mineral wool and the overlay binder is cooked pearl cornstarch.

In another aspect of the present invention, a method of making the durable acoustical panel comprises forming an aqueous slurry comprising a fibrous filler, a base binder, and water; depositing the aqueous slurry onto a moving foraminous support wire to form an aqueous felt; de-watering the aqueous felt to form a wet felt; coating the wet felt with an aqueous overlay comprising nodulated wool, overlay binder, and water; and drying the wet felt and aqueous overlay to form the panel.

Thus, a unique durable acoustical panel and a method of making the same is now provided that successfully addresses the shortcomings of existing ceiling tiles and provides distinct advantages over such ceiling tiles. Additional objects, features, and advantages of the invention will become more apparent upon review of the detailed description set forth below when taken in conjunction with the accompanying drawing figures, which are briefly described as follows.

DETAILED DESCRIPTION OF THE INVENTION

Figure 1:
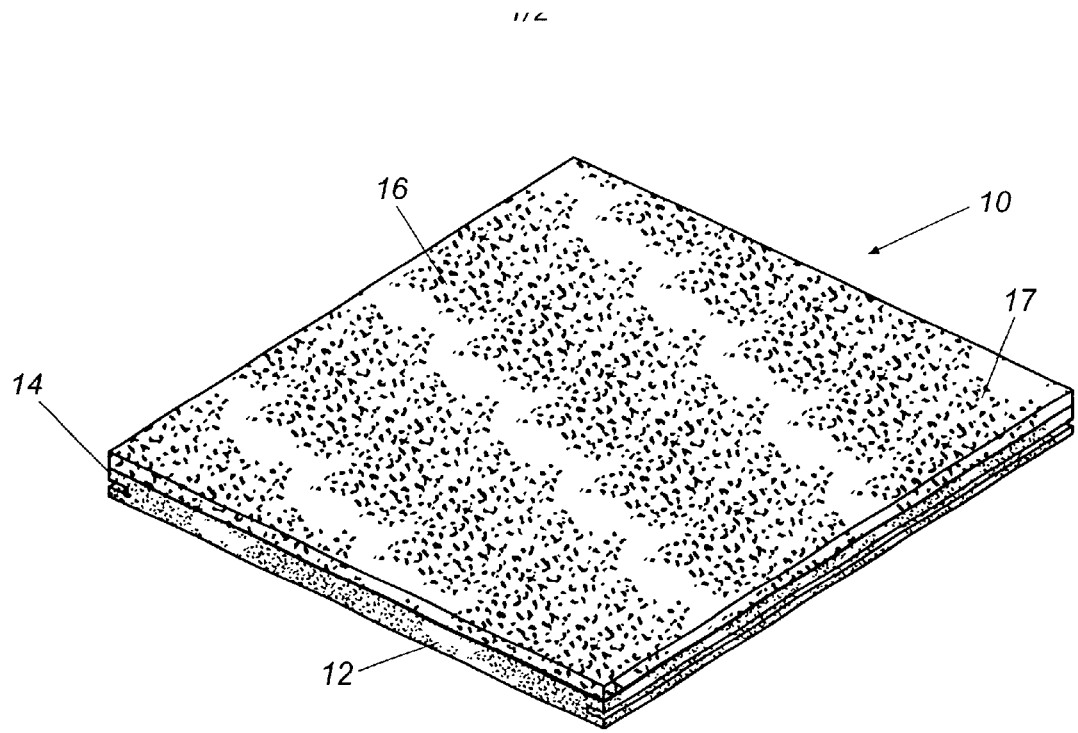
FIG. 1 is a partial elevation view of an embodiment of a durable acoustical panel made in accordance with the present invention.

For a more complete understanding of the present invention, reference should be made to the following detailed description taken in connection with the accompanying drawings, wherein like reference numerals designate corresponding parts throughout the several figures. Referring first to FIG. 1, a durable acoustical panel 10 made in accordance with the present invention is shown. The panel 10 comprises a fiberboard 12 as a base and a nodulated overlay 16 disposed on at least one side 14 of the fiberboard 12. The nodulated overlay 16 has a substantially smooth surface 17. The fiberboard 12 comprises about 30 to about 90 dry wt. % fibrous filler and about 3 to about 10 dry wt. % base binder. In accordance with the present invention the fiberboard 12 can have a density from about 0.8 to about 1.7 lb/bd ft and the overlay 16 can have a density of about 1.5 to about 2.5 lb/bd ft.

As utilized with the present invention, the term "substantially smooth" means that the surface 17 of the overlay 16 defines a plane and at least 50% of overlay surface is substantially flush with the plane and is substantially free of projections extending from the surface 17 beyond the plane. However, the overlay 16 can have fissures extending therein from the plane. Examples of ceiling tiles having a rough or textured surface are GLACIER, manufactured by United States Gypsum and STRATUS, manufactured by Armstrong World Industries, Inc.

The surface 17 of the overlay is at least as smooth as FROST, manufactured by United States Gypsum, or GEOTEX, manufactured by Armstrong World Industries, Inc. The surface texture of the GEOTEX is about 39 ml/sq foot as measured using a texture volume test. The texture volume test uses glass beads to measure the texture volume per square foot of a sample. Essentially, the glass beads fill in the surface texture of the sample to the highest surface point. The texture volume test is described in further detail below.

In another embodiment, the surface texture 17 is about as smooth as half-way between the installed viewable surfaces of STRATUS having a production date of May 19, 2000, and GEOTEX having a production date of Apr. 24, 2000. The surface texture of the STRATUS is about 160 ml/sq foot as measured using the texture volume test. Thus, the surface texture of this embodiment is about less than 100 ml/sq foot.

In greater detail, the texture volume test used to measure the surface texture in the example ceiling tiles comprises a square wooden frame having an inside dimension of about 12 1/16 inches by 12 1/16 inches formed by 1 foot by 1 inch hardwood. The formed frame has two holes drilled in each side to accommodate nails for holding the sample in place. Additionally, 40–60 mesh (Ussieve) class beads available from Potters Industries, Incorporated, Potsdam, N.Y. are used. Referring to the procedures, a sample of the tile is cut to a dimension of about 12 inches by 12 inches having all four edges taped so that the top of the tape is even with the high spots on each side of the sample. The sample is then placed in the frame and the frame is flipped so that the sample phase is flush with the frame top. Nails are inserted into the holes to hold the sample in place and the frame is flipped again so that the sample is face up. The glass beads are then poured onto the sample in a thin layer and using a straight edge the beads are spread out to completely fill the texture. The sample is tapped frequently to settle all the beads within the texture. A small brush is used to gently brush away all the beads from the edges of the frame and the remaining beads are transferred to a clean piece of paper by flipping the board in the frame. Gentle tapping on the back of the board is needed to remove all the beads from the sample. The beads are then poured into a graduated cylinder and the volume is recorded.

Fibrous filler of the fiberboard 12 can be selected from mineral wool, polyester fibers, polypropylene fibers, NYLON fibers, carbon fibers, cellulosic fibers from hard pulped wood, cellulosic fibers from soft pulped wood, wollastonite, fiberglass, rock wool, slag wool, and combinations thereof. In one embodiment, the fibrous filler comprises mineral wool. The mineral wool may comprise fibers of rock wool or basalt wool. The fibers, in general, have a diameter of about 3 to about 6 microns. Further, the fibers may be used in the "sized" or "naked" state. Sizing agents such as mineral oils or acrylic polymer dispersions may be employed. These fibers contribute to the structural integrity and strength of the fiberboard 12.

The base binder may be selected from granular starches, such as, pearl cornstarch, wheat starch, and potato starch, and from polymers, such as polystyrene, polyvinyl acetate, polystyrene acrylics, styrene butadiene, and combinations thereof. In one aspect of the present invention granular pear cornstarch comprises the base binder.

To provide additional strength and sag resistance, the fiberboard 12 can further comprise up to about 15 dry wt. % of cellulose fibers derived from wood fibers, primary paper fibers, secondary paper fibers, or cotton linters. Such primary and secondary paper fibers respectively include pre- and post-consumer paper products, such as newsprint paper. The fiber length can be up to about 1/4 inch in length. In one embodiment, the cellulosic fibers for use in the present invention are newsprint fibers, which generally have a length of from about 1/4 millimeter to about 5 millimeters with an average length of about 1 millimeter. Specifically, the newsprint comprises cellulosic fibers that contribute to the wet strength of the board as it is converted from the slurry to a substantially solid wet felt enroute to becoming the fiberboard 12.

Retention agents may be utilized in the fiberboard 12 to assist in retaining the base binder, non-fibrous fillers, and fibers therein during de-watering operations. There are many such retention agents available on the market which can be employed in the present invention. One such retention agent is a cationic polyacrylamide marketed as PURACHEM 240 EC by Hercules Chemical Co.

Non-fibrous fillers may be employed in the fiberboard in an amount from 0 to about 20 dry wt. %. The non-fibrous fillers can be selected from kaolin clay, calcium carbonate, silica, vermiculite, ball clay or bentonite, talc, mica, gypsum, and combinations thereof, to name only a few.

Expanded perlite can also be employed in the fiberboard in an amount from 0 to about 30 dry wt. %. Perlite is a volcanic glass ore, similar to obsidian with the capacity to expand greatly on heating, typically comprising silica, aluminum, calcium or other alkaline earth silicate. Perlite contributes to the bulk and hardness of the fiberboard. Expanded perlite and a methods of making expanded perlite are discussed in U.S. Pat. No. 5,911,818, which is incorporated herein by reference. Generally, perlite contains 65–75% $SiO_2$, 10–20% $Al_2O_3$, 2–5% $H_2O$, and smaller amounts of soda, potash, and lime. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type, and degree of expansion, size of the bubbles and wall thickness between them, and porosity of the product.

Conventionally, expanded perlite is prepared by first grinding the perlite ore to a fine size. The finely ground perlite ore is then expanded in a perlite expander by heated air having a temperature between about 1375° F. and about 1750° F. The heated air heats the perlite ore which causes it to "pop like popcorn" to form the expanded perlite having a density of about 3 to about 20 pounds per cubic foot. Expanded perlite is a very lightweight material, but it contains many fine cracks and fissures. When expanded perlite is placed in contact with water, the water penetrates the cracks and fissures and enters into the air filled cavities of the perlite, thereby causing the perlite to retain a very large amount of water within the expanded perlite particles. The perlite may also be coated with hydrophobic coatings such as silicones, sizing agents, and the like.

To provide fire-retardancy, the fiberboard 12 includes boric acid. Further, boric acid assists the fiberboard 12 in resisting color degradation during welt felt drying operations. Other such flame-proofing agents may be employed. Boric acid is present in the fiberboard in an amount from 0 to about 1 dry wt. %. Further, pigments, water repellants, etc. may be employed.

Additional water and "dry broke" may be added to the aqueous slurry forming the fiberboard 12. The "dry broke" is predominately recycled board material that may have been rejected or cut from the commercially acceptable boards, as well as other waste products. Dry broke may be employed in an amount from 0 to about 40 dry wt.

Additional additives, such as dispersants, defoaming agents, fungicides, and combinations thereof, may be added to the aqueous slurry which forms the fiberboard in an amount from 0 to about 1 dry wt. %. Such additives are known in the art and may be readily employed by those of ordinary skill in the art.

In the process of preparing the fiberboard, the aforementioned ingredients are mixed together with the amount of water necessary to provide slurry consistency in conventional mixing and holding equipment (not shown). In the present invention, sufficient water is added to form an aqueous slurry comprising from about 2 to about 13 wt. % solids. In one embodiment, the aqueous slurry comprises from about 2 to about 5 wt. % solids.

Acoustical properties (i.e., sound absorption) of ceiling tiles made in accordance with the present invention is based upon sound entering the fiberboard 12 through its pores. While in the fiberboard 12, the sound energy is converted into thermal and mechanical energy due to the natural resonating properties of the materials comprising the fiberboard. The walls of the pores in the fiberboard 12 convert sound to thermal energy via friction. Standard board formation techniques (Fourdrinier or cylinder) using high cellulosic fibers (newsprint) and perlite levels will produce a fiberboard that, although having sufficient total porosity so as not to hinder sound flow completely, will have large pores at the face and smaller pores at the back. This disposition of pores in the fiberboard does not absorb nor convert sound energy efficiently. The large pores on the face do not have enough wall surface area to convert sound to thermal energy and the small pores on the back do not have sufficient cross-sectional area to enable sound to enter the pores. Therefore, although the overall porosity of the fiberboard may be relatively high (85%–90%), substantially less than all of the pores have the appropriate ratio of pore cross-sectional area to pore surface area to permit sound flow into the pores in conjunction with sound absorption within the pores. However, the moving foraminous support wire formation process of this invention produces a homogeneous fiberboard structure such that substantially all of the pores of the fiberboard 12 are available for both sound flow and sound absorption.

Figure 2:
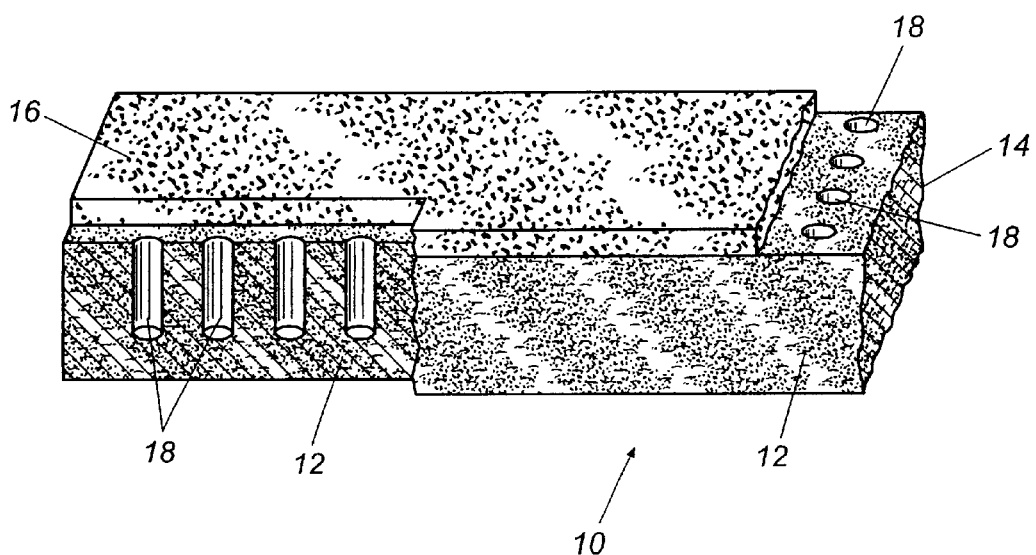
FIG. 2 is a partial perspective view of another embodiment of the durable acoustical panel made in accordance with the present invention.

Thus, the highly acoustical properties of the fiberboard 12 of this invention are attributable to its high porosity and its substantially uniform density face-to-back, i.e., a well-controlled density gradient. Formulations that contain high amounts of man-made fiber usually exhibit high porosity with accompanying acoustical properties. Using current fiberboard forming techniques, formulations containing high amounts of mineral wool will display high NRC's, i.e., at least 0.60. Formulations that contain significant amounts of cellulose and of perlite normally do not exhibit such high NRC's. In the present invention, by uniformly distributing the aqueous slurry across the foraminous support wire prior to draining the water, the fibers form uniformly face-to-back resulting in the substantially even distribution of pore sizes. The mat structure remains set prior to free-drainage and vacuum removal of the water. As further shown in FIG. 2, perforations 18 may be partially disposed through the fiberboard to improve NRC.

Referring again to FIG. 1, the nodulated overlay 16 is disposed on at least one side 14 of the fiberboard 12. The nodulated overlay 16 comprises from about 50 to about 85 dry wt. % nodulated wool and an overlay binder. In the present invention, the overlay binder is selected from starch or a foaming agent. Starches found useful in the present invention include, but are not limited to, pearl cornstarch, wheat starch, potato starch, and combinations thereof. In one embodiment, the starch, such as pearl cornstarch, is mixed with water and heated from about 190° F. to about 210° F. for a sufficient amount of time until the starch and water mixture gel to form a cooked starch. The amount of cooked starch present in the overlay 16, when utilized, is from about 5 to about 12 dry wt. %.

Alternatively, a foaming agent may be utilized in the overlay. Such foaming agents include bis(2-hydroxyethyl)tallowalkylamine (marketed under the tradename ETHOMEEN T-12 by Akzo Nobel Chemicals Inc.), sodium laureth (1) sulfate, ammonium deceth (3) sulfate, ammonium $C_{6-10}$ alcohol ethoxysulfate, sodium dodecylbenzene sulfonate, and combinations thereof. In one embodiment, the foaming agent is bis(2-hydroxyethyl)tallowalkylamine. When employed, the foaming agent is present in the overlay 16 is from about 0.1 to about 1 dry wt. %.

When a foaming agent is employed, the overlay 16 further includes from about 2 to about 8 dry wt. % of a granular binder. The foaming agent is not a binding agent in the same manner as cooked or granular starch, but rather assists in providing a stable body to the overlay, which permits the overlay to be screeded without substantial de-watering. Granular binders include, but are not limited to, pearl cornstarch, wheat starch, potato starch, polystyrene, polyvinyl acetate, polystyrene acrylics, styrene butadiene, and combinations thereof. In addition to the granular binder, 0 to about 1 dry wt. % of aluminum sulfate can be included to assist the foaming agent.

Nodulated wool is prepared from fibrous materials, such as mineral wool, metal slag wool, fiberglass, rock wool, and combinations thereof, and other heat liquefiable raw materials capable of being converted into fibers and nodulated. Conventional methods of nodulating fibers are known in the art, and may be employed in the present invention to nodulate the various fibrous materials described above. The mineral fibers usually have a ratio of length to diameter which is equal to 10 or higher, with lengths which vary between 0.1 and 100 mm, more typically between 1 and 10 mm, and diameters within the range of 0.1 to 25 microns. Wool nodules are characterized by size using a sieve analysis method. The slurry containing all ingredients is washed to separate the nodules from all other ingredients. The wool nodules are dried and then approximately 15 grams–25 grams of the dry nodules are added to the top screen, and separated by W. S. Tyler's Model RX-29 ROTAP. Table 1 shows a size distribution useful in the present invention. A preferred size distribution based upon extensive factory tests, all using the same size nodules, has been listed. A limited number of tests with other size distribution have been run.

TABLE 1

| Screen ID | Preferred Size | Range |
| --- | --- | --- |
| ¼" | 0% | 0% |
| No. 3½ | 0% | 0%–5% |
| No. 6 | 5.6% | 0%–10% |
| No. 10 | 31.2% | 10%–40% |
| No. 14 | 15.1% | 5%–25% |
| No. 20 | 4.7% | 0%–10% |
| Pan | 43.3% | <50% |

Additionally, a slipping agent is employed in the overlay 16 to assist in disposing the nodulated overlay 16 on the fiberboard 12, particularly in screeding operations. In addition to commercially available slipping agents, isostearamidopropyl ethyl dimonium ethosulfate (marketed under the tradename SHERCOQUAT IAS by Scher Chemicals) and polyethylene oxide may be utilized.

The following materials also may be employed in the indicated amounts in the nodulated overlay 16 and are described above:

| | |
| --- | --- |
| cellulose fibers | 0 to about 10 dry wt. % |
| non-fibrous filler | 0 to about 15 dry wt. % |
| expanded perlite | 0 to about 20 dry wt. % |
| boric acid | 0 to about 1 dry wt. % |
| dry broke | 0 to about 35 dry wt. % |
| slipping agent | 0 to about 1 dry wt. % |
| additives | 0 to about 1 dry wt. %. |

However, when a foaming agent is present in the overlay 16, defoaming agents are absent therefrom.

Figure 3:
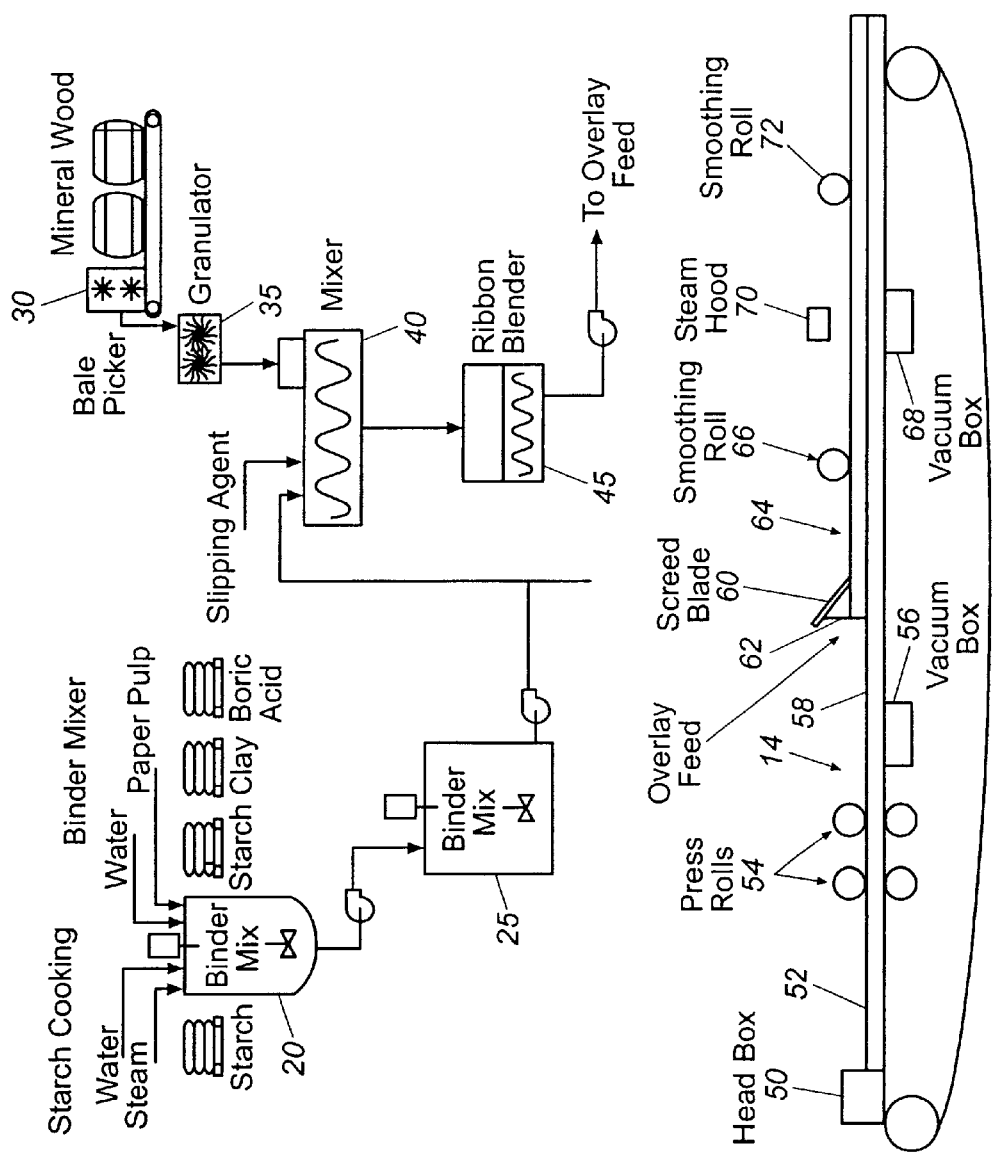
FIG. 3 is a flow diagram of a process in accordance with the present invention.

Referring now to FIG. 3, a method of making the durable acoustical panel 10 in accordance with the present invention is shown. Initially, an aqueous slurry comprising a fibrous filler, a base binder, and water is formed. The aqueous slurry is deposited onto a moving foraminous support wire to form an aqueous felt, thereby creating a continuous process. Thereafter, the aqueous felt is de-watered to form a wet felt. The wet felt is coated with an aqueous overlay comprising nodulated wool, overlay binder, and water. Finally, the wet felt and aqueous overlay are dried to form the panel. The aqueous overlay, regardless of overlay binder, comprises about 15 to about 35 wt. % solids. In another embodiment, the aqueous overlay comprises about 21 to about 28 wt. % solids.

As indicated above, the nodulated overlay 16 can be formed utilizing an overlay binder comprising cooked starch. The cooked starch is formed by mixing water and starch, such as pearl cornstarch, in a mix tank 20. Initially, the starch comprises from about 2 to about 14 wt. % of the water and starch mixture. The water and starch mixture is heated to cook the starch. In the present invention, steam is injected into the mixture to raise the mix temperature to about 190° F. The steam is shut off and the mix is kept agitated for a sufficient amount of time, e.g. 7 minutes, to reach a final temperature of about 200° F. to about 210° F. to form the cooked starch. After this mix cools to about 200° F., additional water is added to the binder mixer 20 water to further dilute the cooked starch. Thereafter, other materials, such as cellulose fibers, non-fibrous fillers, expanded perlite, boric acid, dry broke, and additives may be added to the cooked starch and thoroughly mixed, e.g., 5 minutes. This mix can be pumped to a use tank 25 to be stored until ready for addition into a high shear or ribbon mixer 40. Any mixer that can uniformly mix a high solids fibrous slurry and thus produce wool nodules may be employed. Ribbon mixer 40 is maintained at slow speed (about 20 rpm) while the above described mix is added with the slipping agent and opened wool. Prior to being added to ribbon mixer 40, wool is picked apart from a bale by a conventional bale picker and transferred to a granulator 35 that further breaks down the large wool clumps. After all the aforementioned ingredients are placed in ribbon mixer 40, the speed is increased to 40 rpm for a sufficient amount of time, e.g. 7 minutes, to nodulate the wool fibers and form the aqueous nodulated overlay 16. The speed of ribbon mixer 40 is reduced to 20 rpm for about 1 minute and then transferred to ribbon blender 45 to maintain a substantially uniform blend of the aqueous nodulated overlay 16 and subsequently supply the forming line.

Alternatively, the nodulated overlay 16 can be formed utilizing an overlay binder and a foaming agent. As indicated above, the foaming agent and the granular binder are an alternative to cooked starch. However, cooked starch can be employed with the foaming agent. In this aspect, of the present invention, water is added to the mix tank 20. Thereafter, other materials, such as aluminum sulfate, cellulose fibers (4.0% solids by weight), non-fibrous fillers, expanded perlite, boric acid, dry broke, and additives may be added to the water and thoroughly mixed, e.g., 5 minutes. This mix can be pumped to the use tank 25 to be stored until ready for addition into ribbon mixer 40. Ribbon mixer 40 is kept at high speed, about 40 rpm while the above described mix, foaming agent, and opened wool, as described above, is added thereto. All of the aforementioned ingredients are mixed in ribbon mixer 40 for a sufficient amount of time, e.g. approximately 14 minutes, to nodulate the wool and form the aqueous nodulated overlay. The amount of foaming agent and the mixing time are varied to obtain a wet foam density of 900 grams in a 950 ml cup. This mix is then transferred to ribbon blender 45 to maintain a substantially uniform blend of the aqueous nodulated overlay 16 and subsequently supply the forming line.

The aqueous slurry of the fiberboard 12 is deposited onto the moving foraminous wire from a conventional headbox 50 to form the aqueous felt 52. Immediately following, the aqueous felt 52 is allowed to free-drain water by gravity and is then pressed by press rolls 54 to drain water from the aqueous felt 52, and smooth at least one side 14 of the aqueous felt 52 to create a substantially consistent gauge or thickness across the aqueous felt 52. The aqueous felt 52 is then operably engaged with a vacuum from vacuum box 56 to further de-water the aqueous felt 52 and form the wet felt 58. Optionally, the wet felt 58 can be partially perforated by a conventional perforator (not shown). The wet felt 58 then enters the nip below an oscillating screed blade 60. The screed blade is set at an angle between about 20 to about 40 degrees with respect to the wet felt 58, such as 30 degrees, and oscillates transversely with respect to machine direction with sufficient speed to avoid overlay build-up thereon. In the present invention, the screed blade 60 is formed from, for example, a UHMW plastic, e.g. UHMW polypropylene, to minimize wear and assist in the prevention of overlay buildup. The screed blade 60 can be formed of other materials and/or coatings, particularly materials and coatings which comprise a high wear resistance and a relatively low coefficient of friction.

The aqueous overlay 62 is pumped from ribbon blender 45 to a position behind the screed blade 60. In one embodiment, a reciprocating pipe distributes the aqueous overlay 62 over the wet felt 58. The overlay flow is maintained such that there is a continuous ribbon of aqueous overlay build-up behind the screed blade 60. The nip between the screed blade 60 and the at least one side 14 can be set for a desired overlay thickness, e.g. approximately 0.200". The overlay should be kept at a minimum temperature of 100° F. to maintain its slippery characteristic through the screed blade 60.

The wet felt/aqueous overlay laminate 64 is subsequently pressed using smooth roll 66 (machined surface, cold steel or stainless steel) that rotates co-current with the forming wire, but at a speeds about 50% to about 300%, preferably about 50% to about 150%, faster than the forming wire. The nip of smooth roll 66 is set to press the laminate 64 e.g. up to about 0.150", preferably about 0.100", thereby further smoothing the at least one face 17. The wet felt 58 of the laminate 64 is then operably engaged with a vacuum by vacuum box 68 in the presence of steam directed toward the aqueous overlay from a steam hood to remove water. Various apparatus and techniques for applying steam or de-watering methods which may be employed in the present invention are discussed in U.S. Pat. Nos. 2,642,314, 2,714,839, 2,809,867, 2,838,982, 2,949,239, 3,850,792, and 3,945,881, which are incorporated herein in their entirety. After at least partially de-watering the wet felt and aqueous overlay laminate 64, the laminate 64 is pressed by smoothing roll 72 (machined surface, cold steel or stainless steel) that rotates co-current with the forming wire, e.g. up to about 0.100". Smoothing roll 72 rotates at speeds substantially equal to the forming wire to further smooth the at least one side 14. Finally, the wet felt and aqueous overlay laminate 64 is dried in an oven (not shown) to form the durable acoustical panel 10 of the present invention. To assist in preventing discoloration of the panel 10, the temperature of the oven decreases in machine direction. For example, at the entrance of the oven, the temperature is about 700° F. and gradually decreases to about 400° F. at the oven exit.

Finally, the panel 10 can take on a number of finishes. These include paints, fissuring, routing, etching, embossing, abrading, sanding and any combination thereof. Such techniques a known in the art. Such finishing processes are disclosed in U.S. Pat. Nos. 4,911,788 and 5,277,762, which are incorporated herein in their entirety.

EXAMPLES

The following examples demonstrate the range of formulations for both overlay and fiberboard and the ability to form the panel continuously. It is understood in the art that both cellulose and starch contribute to humidity warping and humidity dimensional stability. In the following examples, the fiber (cellulose) and binder (starch) content can be quantified (excluding filler bound water) by measuring LOI (Loss On Ignition, the board weight loss at 843° C.) of the panel layers. The acoustical properties of fiberboards are measured directly as NRC, Noise Reduction Coefficient. This is a standard test method in accordance to ASTM Test designation C 423-84a, whereby sound adsorption is measured at various frequencies. Hardness is tested in accordance with ASTM C367-95, Sections 2–7.

The following ceiling tiles were made in accordance with the method of the present invention as described above.

Example 1

|  | Overlay | Baseboard |
| --- | --- | --- |
| Mineral Wool | 76.15% | 45.8% |
| Cooked Starch | 10.4% | 0% |
| Granular Starch | 3.5% | 4.7% |
| Cellulose Fibers | 1.8% | 5.1% |
| Non-fibrous filler | 7.5% | 1.8% |
| Expanded Perlite | 0% | 14.5% |
| Boric Acid | 0.6% | 0.5% |
| Dry Broke | 0% | 27.5% |
| Additives | 0% | 0.1% |
| Approx. Thickness (in.) | 0.200" | 0.57" |
| Density (lb/bd ft) | 1.78 | 1.36 pbf |
| Hardness (lbf) | 164 | 131 |
| LOI | 9.6% | 16.6% |

NRC of the unpainted 0.770" ceiling tile was 0.70 (4 frequency average=0.708).

Example 2

|  | Overlay | Baseboard |
| --- | --- | --- |
| Mineral Wool | 76.15% | 52.4 % |
| Cooked Starch | 10.4% | 0% |
| Granular Starch | 3.5% | 4.5% |
| Cellulose Fibers | 1.8% | 5.2% |
| Non-fibrous Filler | 7.5% | 0% |
| Expanded Perlite | 0% | 9.3% |
| Boric Acid | 0.6% | 0.0% |
| Dry Broke | 0% | 28.5% |
| Additives | 0% | 0.1% |
| Approx. Thickness (in.) | .145" | 0.525" |
| Density (lb/bd ft) | 2.17 pbf | 1.50 pbf |
| Hardness (lbf) | 156 | 117 |
| LOI | 9.5% | 16.2% |

The fiberboard formula was changed from Example 1. NRC of the face and back painted 0.670" board was 0.65 (4 frequency average=0.670).

Example 3

|  | Overlay | Baseboard |
| --- | --- | --- |
| Mineral Wool | 81.0% | 45.8% |
| Cooked Starch | 8.3% | 0% |
| Granular Starch | 2.8% | 4.7% |
| Cellulose Fibers | 1.4% | 5.1% |
| Non-fibrous filler | 6.0% | 1.8% |
| Expanded Perlite | 0% | 14.5% |
| Boric Acid | 0.5% | 0.5% |
| Dry Broke | 0% | 27.5% |
| Additives | 0% | 0.1% |
| Approx Thickness (in.) | 0.225" | 0.45" |
| Density (lb/bd ft) | 1.96 | 1.37 pbf |
| Hardness (lbf) | 138 | 88 |
| LOI | 7.4% | 14.3% |

The overlay formula was changed from Example 1. NRC of the unpainted 0.675" board was 0.65 (4 frequency average 0.657).

Example 4

|  | Overlay | Baseboard |
| --- | --- | --- |
| Mineral Wool | 65.6% | 51.8% |
| Granular Starch | 3.7% | 3.7% |
| Ethomeen T-12 (estimate) | 0.3% | 0% |
| Cellulose Fibers | 7.1% | 3.8% |
| Non-fibrous filler | 22.6% | 3.7% |
| Expanded Perlite | 0% | 0.0% |
| Boric Acid | 0.5% | 0.6% |
| Aluminum Sulfate | 0.2% |  |
| Dry Broke | 0% | 36.3% |
| Additives | 0% | 0.4% |
| Approx Thickness (in.) | 0.185" | 0.525" |
| Density (lb/bd ft) | NOT TESTED | |
| Hardness (lbf) |  |  |
| LOI |  |  |

This board was made utilizing a foaming agent. NRC of the face painted 0.710" board was 0.70 (4 frequency average= 0.695). The cup weight of the foamed overlay slurry was 979 gms.

Example 5

|  | Fiberboard |
| --- | --- |
| Mineral Wool | 45.8% |
| Cooked Starch | 0% |
| Granular Starch | 4.7% |
| Cellulose Fibers | 5.1% |
| Non-fibrous filler | 1.8% |
| Expanded Perlite | 14.5% |
| Boric Acid | 0.5% |
| Dry Broke | 27.5% |
| Additives | 0.1% |
| Approx. Thickness (in.) | 0.715" |
| Density (lb/bd ft) | 1.30 pbf |
| Hardness (lbf) | 72 |

This board is the fiberboard used in Examples 1 and 3. NRC of the unpainted 0.710" board was 0.70 (4 frequency average=0.686). This example is provided to demonstrate the ability of the present invention to maintain or improve NRC while improving surface hardness.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, the various components of the embodiments of the invention may be interchanged to produce further embodiments and these further embodiments are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A method of making a durable acoustical panel comprising:

(a) forming an aqueous slurry comprising a fibrous filler, a base binder, and water;

(b) depositing the aqueous slurry onto a moving foraminous support wire to form an aqueous felt;

(c) de-watering the aqueous felt to form a wet felt;

(d) coating the wet felt with an aqueous overlay comprising nodulated wool, overlay binder, and water, wherein the aqueous overlay has a substantially smooth surface; and (e) drying the aqueous overlay coated wet felt at a temperature from about 400° F. to about 750° F. to form the panel.

2. The method of claim 1, wherein the substantially smooth surface has a surface texture of about less than 100 ml/sq. ft.

3. The method of claim 1, wherein in step (c) the aqueous felt is de-watered by pressing.

4. The method of claim 1, wherein in step (c) the aqueous felt is de-watered by operably engaging the aqueous felt with a vacuum.

5. The method of claim 1, further comprising between steps (d) and (e): partially de-watering the aqueous overlay coated wet felt.

6. The method of claim 5, wherein the aqueous overlay coated wet felt is partially de-watered by operably engaging the aqueous overlay coated wet felt with a vacuum.

7. The method of claim 6, further comprising pressing the partially de-watered aqueous overlay coated wet felt.

8. The method of claim 1, further comprising between steps (c) and (d) partially perforating the wet felt.

9. The method of claim 1, wherein in step (d) the aqueous overlay is coated on the wet felt with a screed, thereby forming the aqueous overlay with a substantially smooth surface and the aqueous overlay coated wet felt with a substantially uniform thickness.

10. The method of claim 1, wherein in step (a) the aqueous slurry is formed by substantially uniformly mixing the fibrous filler, the base binder, and water.

11. The method of claim 1, wherein the aqueous slurry of step (a) is a substantially uniform aqueous mixture having between about 2 to about 13 wt. % solids and comprises:

| fibrous filler | about 30 to about 90 dry wt. % |
| --- | --- |
| base binder | about 3 to about 10 dry wt. % |
| cellulose fibers | 0 to about 15 dry wt. % |
| retention aid | about 0.02 to 0.2 dry wt. % |
| non-fibrous filler | 0 to about 20 dry wt. % |
| expanded perlite | 0 to about 30 dry wt. % |
| boric acid | 0 to about 1 dry wt. % |
| dry broke | 0 to about 40 dry wt. % |
| additives | 0 to about 0.5 dry wt. %, | wherein the additives are selected from the group consisting of dispersants, defoaming agents, fungicides, and combinations thereof.

12. The method of claim 11, wherein the fibrous filler is selected from the group consisting of mineral wool, polyester fibers, polypropylene fibers, NYLON fibers, carbon fibers, cellulosic fibers from hard pulped wood, cellulosic fibers from soft pulped wood, wollastonite, fiberglass, rock wool, and combinations thereof.

13. The method of claim 11, wherein the fibrous filler is mineral wool.

14. The method of claim 11, wherein the base binder is granular starch.

15. The method of claim 14, wherein the base binder is selected from the group consisting of pearl cornstarch, wheat starch, potato starch, polystyrene, polyvinyl acetate, polystyrene acrylics, styrene butadiene, and combinations thereof.

16. The method of claim 11, wherein the cellulose fibers are derived from fibers selected from the group consisting of primary paper fibers, secondary paper fibers, and cotton linters.

17. The method of claim 11, wherein the non-fibrous filler is selected from the group consisting of kaolin clay, calcium carbonate, silica, vermiculite, ball clay, talc, mica, gypsum, and combinations thereof.

18. The method of claim 1, wherein the aqueous overlay is a substantially uniform aqueous mixture having between about 15 to about 35 wt. % solids and the overlay binder is selected from the group consisting of a cooked starch and a foaming agent.

19. The method of claim 18, wherein the aqueous overlay comprises:

| | |
|---|---|
| nodulated wool | about 50 to about 85 dry wt. % |
| cellulose fibers | 0 to about 10 dry wt. % |
| non-fibrous filler | 0 to about 15 dry wt. % |
| expanded perlite | 0 to about 20 dry wt. % |
| boric acid | 0 to about 1 dry wt. % |
| dry broke | 0 to about 35 dry wt. % |
| slipping agent | 0 to about 1 dry wt. % |
| additives | 0 to about 1 dry wt. %, | wherein the additives are selected from the group consisting of dispersants, defoaming agents, fungicides, and combinations thereof with the proviso that defoaming agents are absent in the overlay when a foaming agent is present therein.

20. The method of claim 19, wherein the overlay binder is cooked starch comprising about 5 to about 12 dry wt. % of the aqueous overlay and is selected from the group consisting of pearl cornstarch, wheat starch, potato starch, and combinations thereof.

21. The method of claim 1, wherein the overlay binder comprises about 2 to about 8 wt. % of a granular binder and 0 to about 1 dry wt. % aluminum sulfate.

22. The method of claim 21, wherein the granular binder is selected from the group consisting of pearl cornstarch, wheat starch, potato starch, polystyrene, polyvinyl acetate, polystyrene acrylics, styrene butadiene, and combinations thereof.

23. The method of claim 19, wherein the cellulose fibers are derived from fibers selected from the group consisting of primary paper fibers, secondary paper fibers and cotton linters.

24. The method of claim 19, wherein the non-fibrous filler is selected from the group consisting of kaolin clay, calcium carbonate, silica, vermiculite, ball clay, talc, mica, gypsum, and combinations thereof.

25. The method of claim 1, wherein the nodulated wool is selected from the group consisting of nodulated mineral wool, nodulated metal slag wool, nodulated chopped glass, nodulated rock wool, and combinations thereof.

26. The method of claim 1, wherein in step (c) the aqueous felt in de-watered by pressing and then by operably engaging the aqueous felt with a vacuum.

27. The method of claim 1, wherein the aqueous overlay of step (d) is formed by the steps comprising:

forming a mixture comprising an overlay binder, wool fibers, and water; and agitating the mixture for an amount of time sufficient to substantially uniformly distribute and nodulate the wool fibers.

28. The method of claim 1, wherein the overlay binder is a foaming agent.

29. The method of claim 1, wherein the overlay further comprises a slipping agent.

30. The method of claim 28, wherein the foaming agent comprises about 0.1 to about 1 dry wt. % of the aqueous overlay and is selected from the group consisting of bis(2-hydroxyethyl) tallowalkylamine, sodium laureth (1) sulfate, ammonium deceth (3) sulfate, ammonium $C_{6-10}$ alcohol ethoxysulfate, sodium dodecylbenzene sulfonate, and combinations thereof.

31. The method of claim 29, wherein the slipping agent is selected from the group consisting of isostearamidopropyl ethyl dimonium ethosulfate and polyethylene oxide.

32. A method of making a durable acoustical panel comprising:

(a) forming an aqueous slurry comprising a fibrous filler, a base binder, and water;

(b) depositing the aqueous slurry onto a moving foraminous support wire to form an aqueous felt;

(c) de-watering the aqueous felt to form a wet felt by pressing and then by operably engaging the aqueous felt with a vacuum;

(d) coating the wet felt with an aqueous overlay comprising nodulated wool, overlay binder, and water, wherein the aqueous overlay has a substantially smooth surface; and (e) drying the aqueous overlay coated wet felt to form the panel.

33. The method of claim 32, wherein in step (c) the aqueous felt is de-watered by pressing and then by operably engaging the aqueous felt with a vacuum.

34. The method of claim 32, wherein the aqueous overlay of step (d) is formed by the steps comprising:

forming a mixture comprising an overlay binder, wool fibers, and water; and agitating the mixture for an amount of time sufficient to substantially uniformly distribute and nodulate the wool fibers.

35. The method of claim 32, wherein the overlay binder is a foaming agent.

36. The method of claim 32, wherein the overlay further comprises a slipping agent.

37. The method of claim 32, further comprising between steps (d) and (e): partially de-watering the aqueous overlay coated wet felt.

38. A method of making a durable acoustical panel comprising:

(a) forming an aqueous slurry comprising a fibrous filler, a base binder, and water;

(b) depositing the aqueous slurry onto a moving foraminous support wire to form an aqueous felt;

(c) dewatering the aqueous felt to form a wet felt;

(d) coating an aqueous overlay comprising nodulated wool, overlay binder, and water onto the wet felt by screeding the aqueous overlay, thereby forming an aqueous overlay having a substantially smooth surface and an aqueous overlay coated wet felt having a substantially uniform thickness;

(e) partially de-watering the aqueous overlay coated wet felt; and (f) drying the aqueous overlay coated wet felt to form the panel.

39. The method of claim 38, wherein in step (f) the aqueous overlay coated wet felt is dried at a temperature from about 400° F. to about 750° F.

40. The method of claim 38, wherein the aqueous overlay of step (d) is formed by the steps comprising:
  forming a mixture comprising an overlay binder, wool fibers, and water; and
  agitating the mixture for an amount of time sufficient to substantially uniformly distribute and nodulate the wool fibers.

41. The method of claim 38, wherein the overlay binder is a foaming agent.

42. The method of the claim 38, the overlay further comprises a slipping agent.

43. The method of claim 38, wherein step (g) the aqueous overlay coated wet felt is dried at a temperature from about 400° F. to about 750° F.

44. A method of making a durable acoustical panel comprising:
  (a) forming an aqueous slurry comprising a fibrous filler, a base binder, and water;
  (b) depositing the aqueous slurry onto a moving foraminous support wire to form an aqueous felt;
  (c) de-watering the aqueous felt to form a wet felt;
  (d) forming an aqueous overlay by agitating a mixture comprising an overlay binder, wool fibers, and water; for amount of time sufficient to substantially uniformly distribute and nodulate the wool fibers;
  (e) coating the wet felt with the aqueous overlay, wherein the aqueous overlay has a substantially smooth surface; and
  (f) drying the aqueous overlay coated wet felt to form the panel.

45. The method of claim 44, wherein the overlay binder is a foaming agent.

46. The method of claim 44, wherein the overlay further comprises a slipping agent.

47. The method of claim 44, comprising between steps (d) and (e): partially de-watering the aqueous overlay coated wet felt.

48. A method of making a durable acoustical panel comprising:
  (a) forming an aqueous slurry comprising a fibrous filler, a base binder, and water;
  (b) depositing the aqueous slurry onto a moving foraminous support wire to form an aqueous felt;
  (c) de-watering the aqueous felt to form a wet felt;
  (d) coating the wet felt with an aqueous overlay comprising nodulated wool, overlay binder, and water; and
  (e) drying the aqueous overlay coated wet felt at a temperature from about 400° F. to about 750° F. to form the panel.

49. The method of claim 48, wherein in step (c) the aqueous felt is de-watered by operably engaging the aqueous felt with a vacuum.

50. The method claim 48, further comprising between steps (d) and (e): partially de-watering the aqueous overlay coated wet felt.

51. The method of claim 50, wherein the aqueous overlay coated wet felt is partially de-watered by operably engaging the aqueous overlay coated wet felt with a vacuum.

* * * * *